(12) United States Patent
Suzuki (10) Patent No.: US 6,215,473 B1
(45) Date of Patent: Apr. 10, 2001

(54) DATA INPUT APPARATUS (75) Inventor: Katsutoshi Suzuki, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/097,311

(22) Filed: Jun. 12, 1998

(30) Foreign Application Priority Data

Jun. 19, 1997 (JP) .................................................. 9-162894

(51) Int. Cl.$^7$ ............................................................ G09G 5/08
(52) U.S. Cl. ....................... 345/163; 345/156; 345/157; 345/164; 345/126; 345/437
(58) Field of Search .................................... 345/156, 157, 345/162, 163, 164, 165, 126, 437

(56) References Cited

U.S. PATENT DOCUMENTS

| 5,095,303 | * | 3/1992 | Clark et al. ............................ 345/164 |
| 5,298,919 | * | 3/1994 | Chang ................................... 345/163 |
| 5,313,230 | * | 5/1994 | Venolia et al. ........................ 345/163 |
| 5,329,276 | * | 7/1994 | Hirabayashi ..................... 340/870.31 |
| 5,473,344 |   | 12/1995 | Bacon et al. .......................... 345/163 |
| 5,619,231 | * | 4/1997 | Shouen ................................. 345/163 |
| 5,912,661 | * | 6/1999 | Siddiqui ............................... 345/166 |
| 5,936,612 | * | 8/1999 | Wang .................................... 345/164 |
| 5,963,197 | * | 10/1999 | Bacon et al. .......................... 345/163 |

FOREIGN PATENT DOCUMENTS

| 2-282818 | 11/1990 | (JP) . |
| 5-233146 | 9/1993 | (JP) . |

* cited by examiner

Primary Examiner—Richard Hjerpe
Assistant Examiner—Henry N. Tran
(74) Attorney, Agent, or Firm—Brinks Hofer Gilson & Lione

(57) ABSTRACT

When one of rollers Xa and Xb rotating about the X axis rotates, an image on the screen moves in the X direction; when both rollers rotate in the same direction at the same time, the image rotates about the X axis; and when both rollers rotate in opposite directions to each other at the same time, the image rotates about the Z axis. With rollers Ya and Yb, movement in the X direction, rotation about the Y axis, and rotation about the Z axis can be input. When a roller Za rotates, the image moves in the Z direction. With the above structure, movement data and rotational data in the three-dimensional space can be input.

8 Claims, 5 Drawing Sheets

DATA INPUT APPARATUS

BACKGROUND OF THE INVENTION

1. Field of the Invention

The present invention relates to data input apparatuses used, for example, for handling three-dimensional figures in computer graphics.

2. Description of the Related Art

In image processing on a workstation or a personal computer, a three-dimensional structural formula of a molecule can be displayed on a computer screen for research and development, or a three-dimensional figure can be displayed on the screen in game simulation or architectural simulation. As it is necessary to move or rotate the three-dimensional structural formula or the three-dimensional figure on the screen, a controller for manipulating such a three-dimensional figure in a three-dimensional manner on the screen is required.

As such a controller, a keyboard is conventionally used by pressing an assigned key to change the mode to a three-dimensional mode.

Japanese Unexamined Patent Publication Nos. 2-282818 and 5-233146 have disclosed three-dimensional-figure controllers used in computer graphics.

Figure 6:
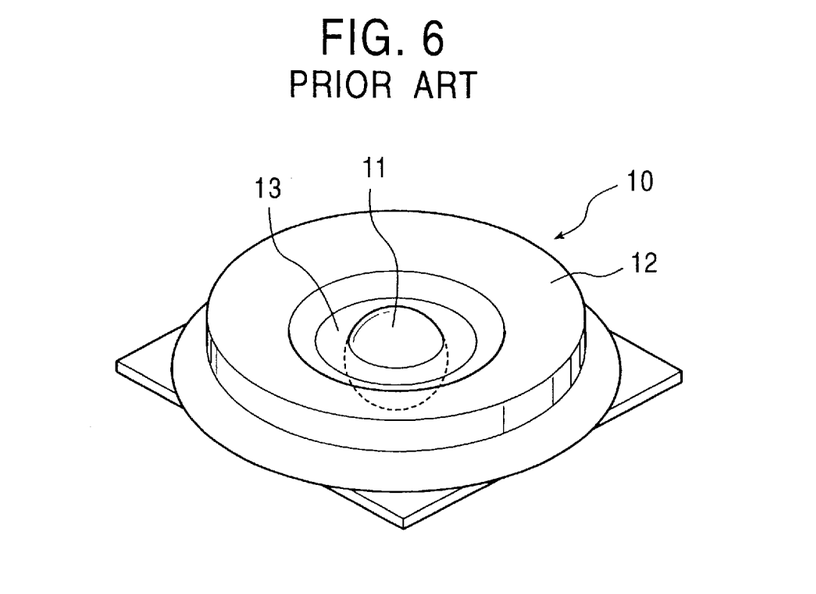
FIG. 6 is a perspective view of a conventional three-dimensional-figure controller.

Japanese Unexamined Patent Publication No. 5-233146 describes a three-dimensional-figure controller 10 shown in FIG. 6. The controller 10 is provided with a truncated-cone-shaped, large-diameter ring 12 disposed rotatably, a spherical trackball 11 disposed rotatably in two directions perpendicular to each other and the diagonal directions, at the center of the ring 12, and a ring-shaped upper cover 13 disposed at an upper portion of the trackball 11.

In the controller 10, the trackball 11 generates a two-dimensional-figure signal and the added rotatable ring 12 allows a three-dimensional-figure signal to be produced.

Figure 7:
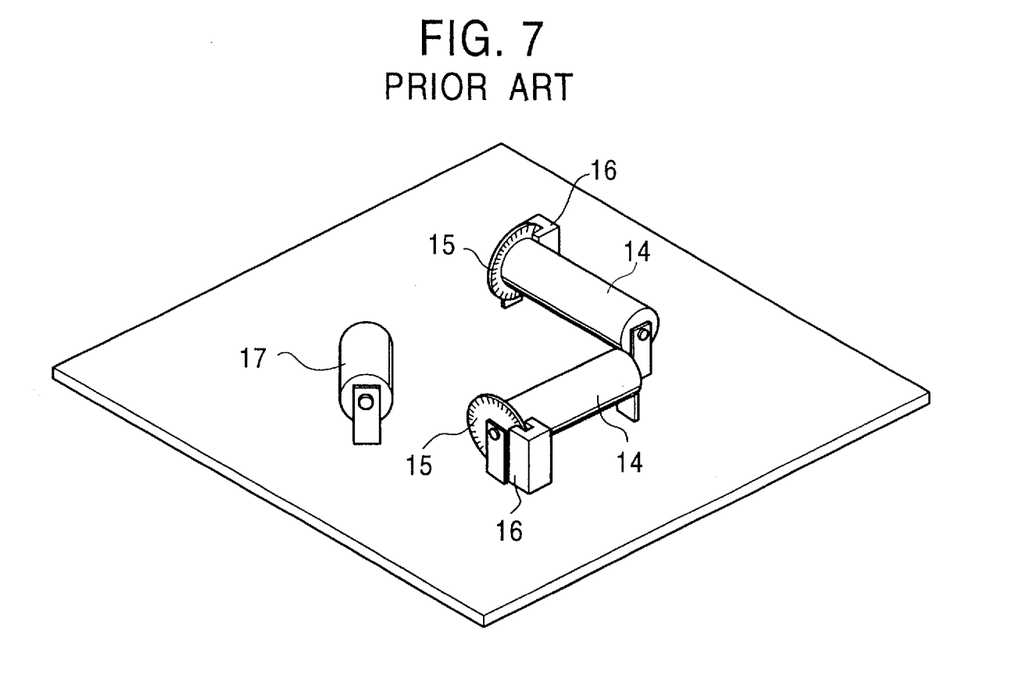
FIG. 7 is a perspective view of a part of the inside of the conventional three-dimensional-figure controller.

An internal structure of the controller 10 will be described below with reference to FIG. 7. The trackball 11 disposed in the controller 10 is butted against rollers 14 disposed below the trackball, the rollers 14 being supported by shafts disposed in two directions perpendicular to each other. A small roller 17 is also disposed in the vicinity of the rollers 14 to prevent the trackball 11 from dropping. At one end of each roller 14, a circular plate 15 having slits at its periphery is formed so as to rotate together with the roller 14. At a part of the periphery of each circular plate 15, an encoder 16 such as an optocoupler is provided for detecting the direction and the amount of rotation of the trackball 11. The large-diameter ring 12 is also provided with slits (not shown) at a side face formed at the periphery. An encoder is disposed to detect the direction and the amount of rotation of the ring 12.

The data detected by the encoders 16 and the other encoder is converted to a coordinate on a display screen to allow the object shown on the screen to move and rotate three-dimensionally in real time.

Usually in the controller 10, the trackball 11 is operated with the forefinger, the middle finger, or the third finger, and the ring 12 is operated with the thumb.

The controller has the following drawbacks.

(1) When two-dimensional coordinate data in the X-Y plane is input with the trackball 11, it is necessary to switch the mode by operating a switch such as an assigned key on the keyboard to enable either a movement-data input mode, in which the object indicated by the cursor or the image on the screen is simply moved in the plane, or a rotational-data input mode, in which the object is rotated about the X axis or the Y axis. This operation is troublesome.

(2) It is necessary to press an assigned key on the keyboard to change the mode to the three-dimensional-figure input mode and a key operation is also required to return to the two-dimensional input mode. Such operations are troublesome and reduce operation efficiency.

(3) To increase operability in the controller 10 shown in FIG. 6, it is necessary to extend the diameter of the trackball 11. When the diameter is extended, the depth and width are accordingly increased and the diameter of the ring 12, which is formed around the trackball 11, is also increased. Therefore, the controller 10 becomes a thick structure. In addition, since this means it is difficult to design a compact controller, the controller is provided with difficulty for a compact computer such as a notebook-type computer. Operation is troublesome in some cases since it is necessary to use many fingers and the range in which a finger moves needs to be extended in relation to the trackball 11 and the ring 12.

SUMMARY OF THE INVENTION

Accordingly, it is an object of the present invention to provide a data input apparatus employing two operation members to allow both movement data and rotational data among two-dimensional-figure data to be input.

Another object is to provide a data input apparatus which allows three-dimensional-figure coordinate data to be input with a single-hand operation.

Still another object is to provide a thin data input apparatus.

The foregoing objects of the present invention are achieved through the provision of a data input apparatus including: a pair of operation members which can rotate in the same direction; an encoder driven by each operation member; a detecting section for detecting the output of each encoder; and with a case in which the detecting section obtains the rotation-detection output of only one operation member, being called a first input mode, and a case in which the detecting section obtains a rotation-detection output indicating that the pair of operation members rotate in the same direction at the same time, being called a second input mode, coordinate-data conversion means for converting the rotation-detection output to movement data on a coordinate system in either the first input mode or the second input mode and for converting the rotation-detection output to rotational data about a certain axis on the coordinate system in the other mode.

For example, when only one operation member is operated, movement data is input; and when the pair of operation members is rotated in the same direction at the same time, rotational data is input. Conversely, the apparatus may be configured such that when the pair of operation members is rotated in the same direction at the same time, movement data is input; and when only one operation member is operated, rotational data is input.

With a case in which the detecting section obtains a rotation-detection output indicating that the pair of operation members rotate in opposite directions at the same time, being called a third input mode, the coordinate-data conversion means may convert the rotation-detection output in the third input mode to rotational data about the axis perpendicular to the coordinate plane of the movement data.

The data input apparatus may be configured such that a pair of operation members which can rotate in the same direction about the X axis and a pair of operation members which can rotate in the same direction about the Y axis which is perpendicular to the X axis are provided, and movement data on the X-Y coordinate plane, rotational data about the X axis, and rotational data about the Y axis are obtained with the use of both pairs of operation members.

Alternatively, the data input apparatus may be configured such that a pair of operation members which can rotate in the same direction about the X axis and a pair of operation members which can rotate in the same direction about the Y axis which is perpendicular to the X axis are provided, and movement data on the X-Y coordinate plane, rotational data about the X axis, rotational data about the Y axis, and rotational data about the Z axis which is perpendicular to the X axis and the Y axis are obtained with the use of both pairs of operation members.

The data input apparatus can also include comparison means for comparing the rotation-detection output obtained from the detecting section at the rotation of one of a pair of operation members which can rotate in the same direction, with the rotation-detection output obtained from the detecting section at the rotation of the other member to determine whether only one of both operation members rotates or both members rotate at the same time.

The pair of operation members has a roller shape and can independently rotate about axes directing in the same direction or about axes aligned in the same straight line. Two spherical rotating members, such as trackballs, generating an X-axis rotation output and a Y-axis rotation output may be provided to serve as the pair of rotation members.

According to the present invention, by operating a pair of operation members at the same time or by operating each of the pair of operation members separately, both movement data on the coordinate plane and rotational data can be input, without operating a key on the keyboard. By rotating the pair of operation members in opposite directions, rotational data about the Z axis can be input, and thereby the data input apparatus can be used as a three-dimensional-figure controller.

The data input apparatus may be configured such that it further includes a single operation member separated from the pair of operation members; an encoder driven by the single operation member; and a detecting section for detecting the output of the encoder, and the coordinate-data conversion means converts the rotation-detection output obtained from the detecting section to movement data in a direction different from the direction of the movement data input by the pair of operation members in the coordinate system.

With this single operation member being provided, movement data in the three-dimensional space can be input.

As described above, according to the present invention, the input mode is switched by operating the pair of operation members, such as rollers, at the same time or by operating only one operation member, and an image on the screen moves in one mode and the image rotates in the other mode. Therefore, it is unnecessary to switch between the movement mode and the rotation mode by a key operation on the keyboard.

By operating the pair of rotating members in opposite directions, an image on the screen can be rotated about an axis other than the axes about which the rotating members rotate.

With two pairs of operation members being provided, movement data and rotational data in the three-dimensional space can be input. With a single operation member being added, movement and rotation in all directions in the three-dimensional space are allowed.

DESCRIPTION OF THE PREFERRED EMBODIMENT

A data input apparatus according to an embodiment of the present invention will be described below by referring to the drawings.

Figure 1:
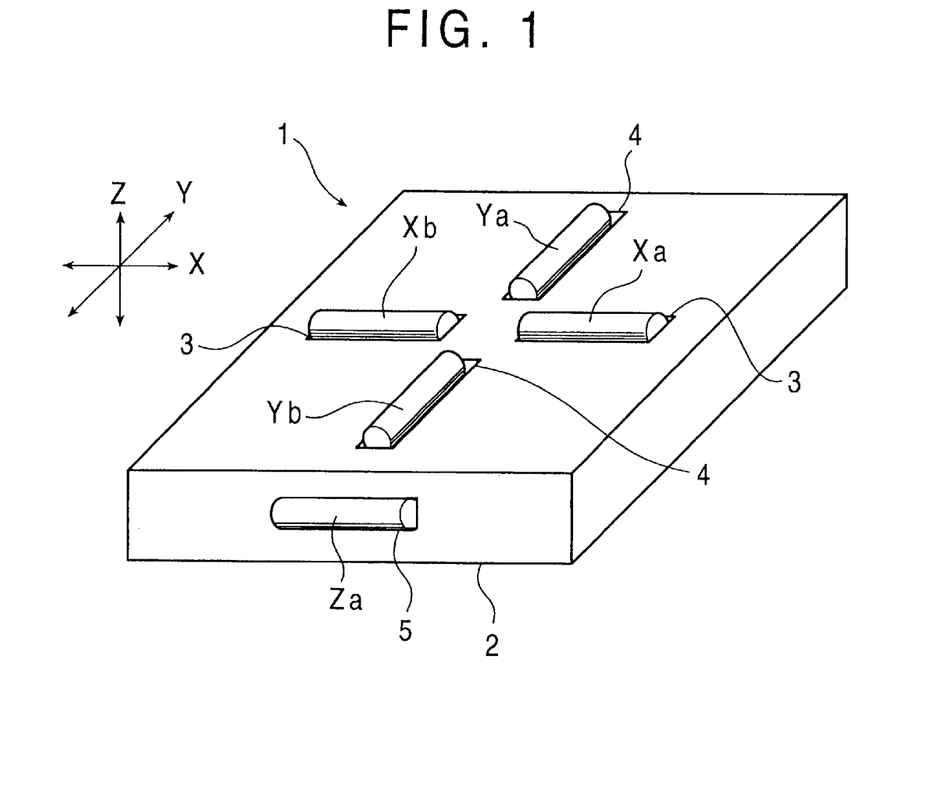
FIG. 1 is a perspective view of a three-dimensional-figure controller which is taken as an example of a data input apparatus of the present invention.
Figure 2:
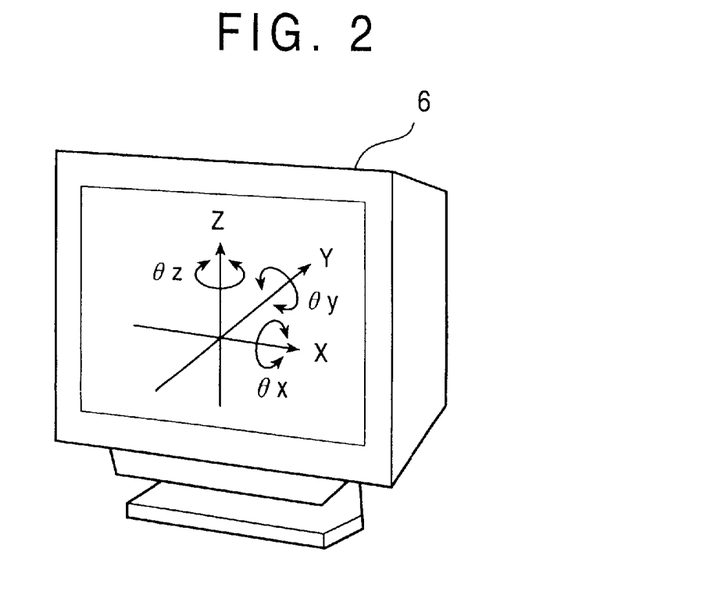
FIG. 2 is a view showing the relationship between the coordinate axes of the three-dimensional-figure controller of the present invention and those on the screen of a display unit.

FIG. 1 is a perspective view of a three-dimensional controller 1, which is taken as an example of a data input apparatus of the present invention. FIG. 2 is a perspective view of a display unit 6 which shows the movement and rotation of an image, processed according to a signal input by the three-dimensional controller 1. As shown in FIGS. 1 and 2, the same orthogonal coordinate system (X-Y-Z coordinates) is used to indicate the directions in which the three-dimensional-figure controller 1 is disposed and the image processing coordinate system on the display screen.

The three-dimensional controller 1 has a box-shaped case 2. The case 2 may be a part of the keyboard housing of a personal computer.

On the upper surface of the case 2, pairs of straight, rectangular notches 3 and 4 are formed in the X-axis and the Y-axis directions, respectively. In the notches 3, column-shaped rollers Xa and Xb are rotatably supported by shafts as a pair of operation members. Column-shaped rollers Ya and Yb are also rotatably supported by shafts as a pair of operation members in the notches 4. The rollers Xa and Xb are rotatable about the shafts disposed on the same line. The rollers Ya and Yb are also rotatable about the shafts disposed on the same line.

A rectangular notch 5 is further provided at a near side face of the case 2. A column-shaped roller Za (a single operation member) is rotatably supported by a shaft arranged in the X-axis direction in the notch 5.

Figure 3:
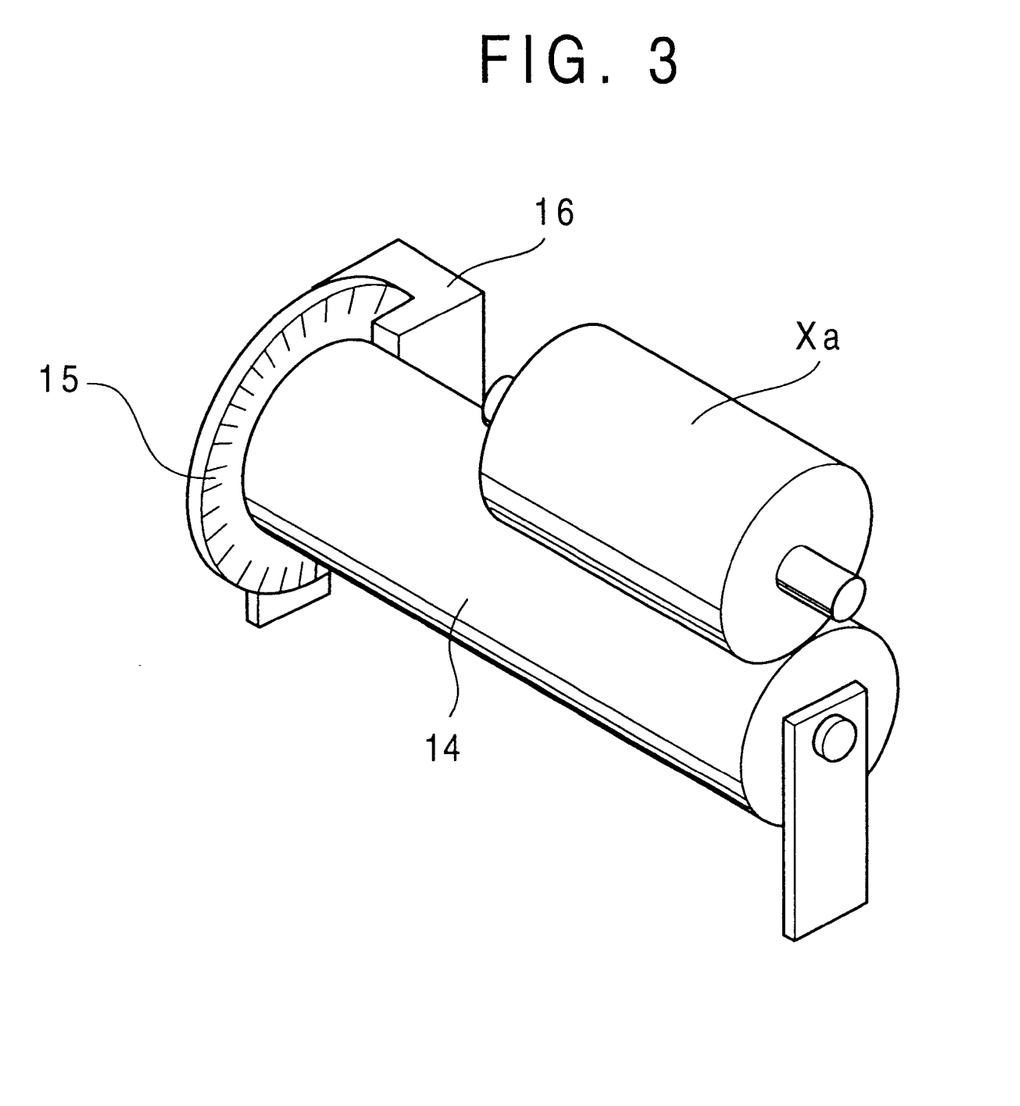
FIG. 3 is an expanded perspective view of a part of the inside of the three-dimensional-figure controller according to the present invention.

FIG. 3 shows a part of the inside of the controller 1. It includes a structure formed below the roller Xa. The components and structure used may be those employed in the conventional case shown in FIG. 7.

The condition shown in FIG. 3 will be briefly described below. The roller Xa is supported by a shaft disposed in the X-axis direction. Therebelow, a column-shaped supporting roller 14 is supported by a shaft aligned in the same direction as that of the roller Xa and can be contacted to the roller Xa at a line. At a side face of one end of the supporting roller 14, a circular plate 15 being larger than the supporting roller 14 in diameter and having slits on its circumference is formed. An encoder 16 for detecting the direction and the amount of rotation of the circular plate 15 is disposed so as to sandwich a part of the periphery of the circular plate 15.

The encoder 16 has optocouplers. At one side of the periphery of the circular plate 15, light-emitting devices are disposed and light-receiving devices are disposed at the other end in an opposing manner. As the slits formed at a certain pitch on the periphery of the circular plate 15 pass, pulses are output from the light-receiving devices and are rectified and used. Two pairs of light-emitting devices and light-receiving devices are provided at different positions (phases) in the direction of rotation. From the outputs of the light-receiving devices, the direction of rotation of the circular plate 15 is detected. Pulses having the frequency corresponding to the rotation speed of the circular plate 15 are obtained from the light-receiving devices.

The foregoing description is only for the roller Xa. For the other rollers Xb, Ya, Yb, and Za, the same supporting rollers 14, the same circular plates 15, and the same encoders 16 are provided.

The three-dimensional-figure controller 1 formed in this way according to the present invention can move and rotate a three-dimensional figure displayed on the screen of the display unit 6 in three-dimensional image processing in the computer.

Figure 4:
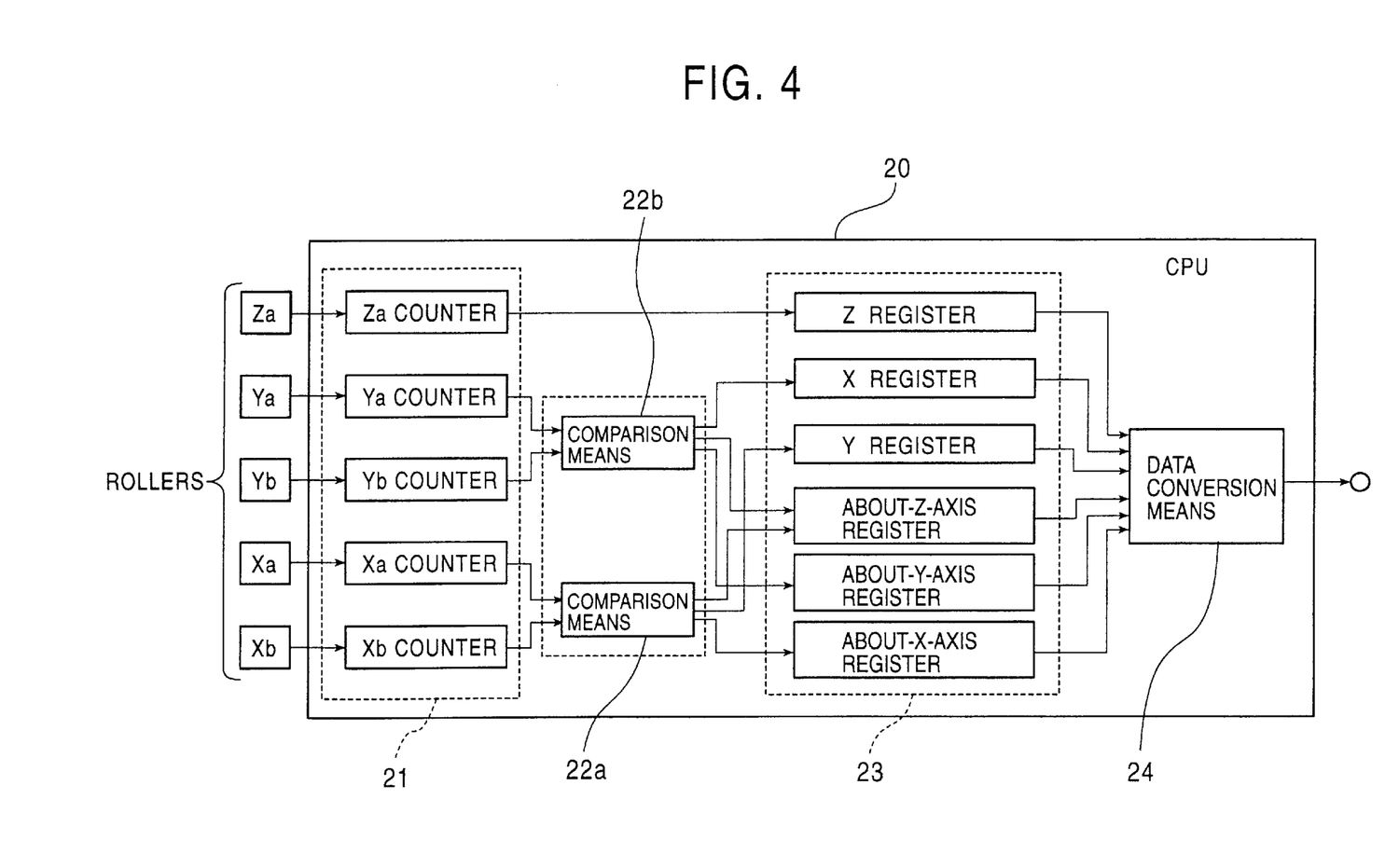
FIG. 4 is an outline view indicating the internal processing of a CPU used in the three-dimensional-figure controller according to the present invention.

FIG. 4 shows a processing procedure in a central processing unit (CPU) 20 of a computer to which the three-dimensional-figure controller 1 inputs a signal. It shows a procedure used in the CPU 20, for outputting input data according to the rotation conditions of the rollers Xa, Xb, Ya, Yb, and Za on the screen. In FIG. 4, the processing procedure is shown by the corresponding circuit configuration. Therefore, the circuit shown in FIG. 4 can be made with various electronic components and ICs.

In the CPU 20, a detecting section for detecting data obtained from the encoders 16 according to the direction and the amount of rotation of each of the rollers Xa, Xb, Ya, Yb and Za in the three-dimensional-figure controller 1 includes: a plurality of counters 21 each of which separately corresponds to the encoder of each roller; two comparison means 22a and 22b for checking whether the rollers Xa, Xb, Ya, and Yb rotate and their directions of rotation; a plurality of registers 23 for storing data (rotation-detection output) obtained from the counters 21 and the comparison means 22a and 22b; and data conversion means 24 for computing the data obtained from the registers 23 to output it as coordinate data on the screen. In the present invention, coordinate-data conversion means is formed of the plurality of registers 23 and the data conversion means 24.

In the CPU 20, the counters 21 count the direction and the amount of rotation of each of the rollers Xa, Xb, Ya, Yb, and Za and then the comparison means 22a and 22b check whether the two pairs of rollers Xa and Xb, and Ya and Yb, excluding the roller Za, rotate and their directions.

According to the results, rotation-detection outputs obtained from the counters 21 are stored in registers 23 and output as coordinate data through the data conversion means 24. With this operation, a three-dimensional figure displayed on the screen, for example, can be moved or rotated. It is also possible to display the movement and rotation of the cursor.

The processing procedure of input data using the three-dimensional-figure controller 1 will be described below by referring to a flowchart shown in FIG. 5.

When each roller of the three-dimensional-figure controller shown in FIG. 1 is rotated, the direction of the rotation corresponds to an X-Y-Z coordinate on the display unit 6, and an image on the screen moves or rotates in the direction in which a finger rotates the roller. Therefore, the user can get an operation feeling in which the movement of the finger which operates the roller directly corresponds to the movement or rotation of the image on the display unit 6.

In a common step for each roller, the output of each encoder 16 disposed for each of the rollers Xa, Xb, Ya, Yb, and Za is counted by each counter 21, and whether each roller rotates, the direction of rotation, and the amount of rotation are detected (step 1).

Figure 5:
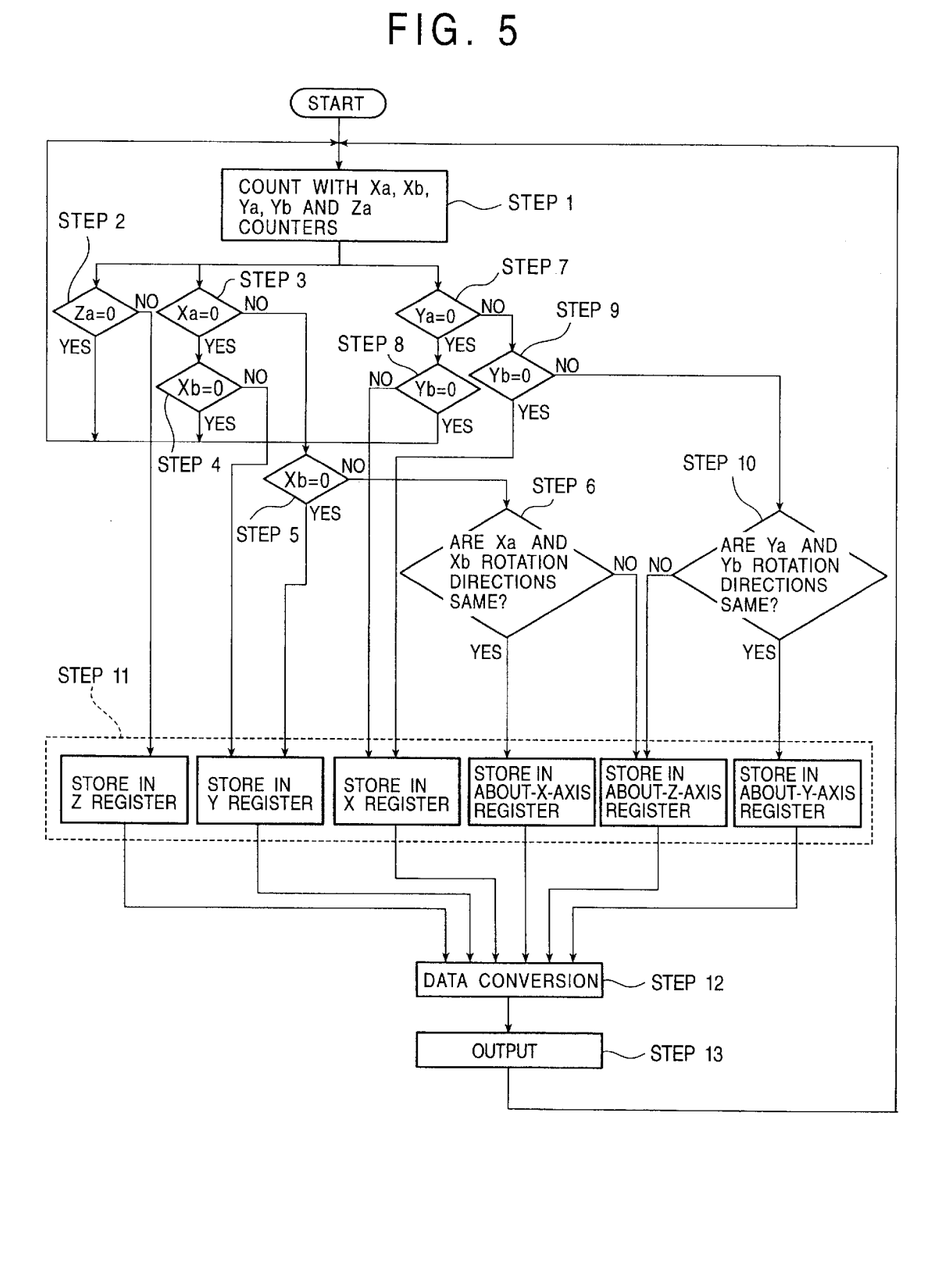
FIG. 5 is a flowchart showing the procedure of a software processing inside the CPU.

For the roller Za, as shown in FIG. 5, the rotation-detection output obtained from the Za counter is handled in a step 2 and steps 11 to 13.

When the rotation-detection output of the roller Za detected by the Za counter in the step 1 is zero (Za=0; zero indicates that the roller has not yet been rotated) in the step 2, the procedure returns to the start. When Za is not zero (not zero indicates that the roller is rotating), the procedure proceeds to a step 11. In the step 11, a Z register, which is a part of the coordinate-data conversion means, stores the rotation-detection output. The output is converted in a step 12 and output to an image processing section in a step 13 to move a three-dimensional figure or the cursor shown in the display unit 6 of FIG. 2 in the Z direction.

The rollers Xa and Xb will be described next. The rollers Xa and Xb are handled in steps 3 to 6 and the steps 11 to 13. When the rotation-detection output of the roller Xa counted in the step 1 is zero in a step 3, the procedure proceeds to a step 4. When the rotation-detection output of the roller Xb counted in step 1 is zero in the step 4, the procedure returns to the start.

When Xa is not zero in the step 3, the procedure goes to a step 5. In the step 5, the comparison means 22a compares the rotation-detection output of the roller Xb. When Xb is zero, the procedure goes to the step 11 to store the rotation-detection output of the roller Xa into a Y register. The output is converted to movement data on the coordinate system (step 12) and output to the image processing section (step 13). In this case, the figure shown on the screen moves in the Y-axis direction (vertical direction) on the screen of the display unit 6 shown in FIG. 2. The image shown on the screen is contracted or extended to indicate that the image is moving in the Y-axis direction.

When Xb is not zero in the step 5, the procedure proceeds to the step 6. In the step 6, the comparison means 22a compares the rotation-direction output of the roller Xa with that of the roller Xb. When both rollers Xa and Xb rotate in the same direction, at least one of the rotation-direction outputs of the rollers Xa and Xb is stored in an about-X-axis register in the step 11. The output is then converted to rotational data on the coordinate system and output in the steps 12 and 13. As a result, the figure shown in the display unit 6 rotates about the X axis on the screen ($\theta$x rotation).

In the step 6, when it is determined from the result obtained by the comparison means 22a that the roller Xa and the roller Xb rotate in opposite directions, at least one of the rotation-direction outputs of both rollers Xa and Xb is stored in an about-Z-axis register in the step 11. The same processing is performed in the steps 12 and 13 to output an about-Z-axis rotational data as coordinate data. As a result, the figure shown on the screen rotates about the Z axis on the screen ($\theta$z rotation).

When Xa is zero in the step 3 and Xb is not zero in the step 4, movement data in the Y-axis direction is output.

In other words, when either the roller Xa or the roller Xb rotates, the output is converted to movement data in the Y-axis direction; when both rollers rotate in the same direction at the same time, the output is converted to about-X-axis ($\theta$x) rotational data; and when both rollers rotate in opposite directions to each other at the same time, the output is converted to about-Z-axis ($\theta$z) rotational data.

Next, the rollers Ya and Yb will be described. The rotation-detection outputs of the rollers Ya and Y are handled in steps 7 to 13. In the step 7, it is determined whether the roller Ya is rotating. When the rotation-detection output of the roller Ya counted in the step 1 is zero, the procedure proceeds to a step 8. In the step 8, the comparison means 22b compares the rotation-detection output of the roller Yb, and when Yb is zero, the procedure returns to the start.

When Yb is not zero in the step 8, the rotation-detection output is stored in an X register (step 11) and output as movement data in the X-axis direction. As a result, the figure on the screen moves in the X-axis direction (horizontal direction) shown in FIG. 2.

When Ya is not zero in the step 7, the procedure proceeds to a step 9. In the step 9, the comparison means 22a compares the rotation output of the roller Yb. When Yb is zero, the output is stored in the X register in the step 11 in the same way as above and output as movement data in the X-axis direction.

In the step 9, when Yb is not zero, namely, when the rollers Ya and Yb rotate at the same time, the procedure goes to a step 10. In the step 10, the rotation directions of the rollers Ya and Yb are compared. When the rollers Ya and Yb rotate in different directions, the output is stored in the about-Z-axis register in the step 11 and output as rotational data. When the rollers Ya and Yb rotate in the same direction, the output is stored in the about-Y-axis register and output as rotational data.

Therefore, when the rollers Ya and Yb rotate in the same direction, the figure rotates about the Y axis ($\theta$y direction) on the screen of the display unit 6 shown in FIG. 2. When the rollers Ya and Yb rotate in opposite directions, the figure rotates about the Z axis ($\theta$z direction).

In other words, when either the roller Ya or the roller Yb rotates, the output is converted to movement data in the X-axis direction; when both rollers rotate in the same direction at the same time, the output is converted to about-Y-axis ($\theta$y) rotational data; and when both rollers rotate in opposite directions to each other at the same time, the output is converted to about-Z-axis ($\theta$z) rotational data.

As described above, the three-dimensional-figure controller according to the present invention can easily move, rotate, contract, and extend in a three-dimensional manner a three-dimensional figure, such as a structural formula of a molecule and a character and background in a game, displayed on the screen. As for the operability of the controller, only five rollers are used for three-dimensional-figure processing, without changing the mode to that for three-dimensional-figure inputs with a key operation on the keyboard. When the four rollers provided in the X-axis and Y-axis directions are disposed closely in the three-dimensional-figure controller, a figure on the screen can be manipulated in the two directions even with single-finger operations. In addition, when the rollers are made narrower and shorter, the controller becomes more compact, and it can be disposed in a notebook-type computer.

In the controller of the present invention, since usually employed components can be used for the internal components of the controller, such as the encoders, and the processing from the input to the output can be performed in a simple manner by the use of a computer software program, the controller can be designed at low cost without using an expensive component.

A three-dimensional-figure controller according to the present invention is not limited to that described above. An operation member may be a spherical ball instead of a column-shaped roller. The number of the operation members can be reduced from four to two. A three-dimensional-figure controller may be formed, unlike that in the above embodiment, such that when a pair of rollers rotates at the same time, movement is produced; and when only one of them rotates, rotation is obtained.

The coordinate indicating the position of the controller, shown in FIG. 1 does not necessarily match that on the screen of the display unit shown in FIG. 2. On the screen of FIG. 2, for example, the Y axis and the Z axis may be switched. In this case, when either the roller Xa or the roller Xb rotates, the figure moves vertically on the screen; and when a pair of rollers rotates in opposite directions, the figure rotates about the axis perpendicular to the screen.

What is claimed is:

1. A data input apparatus comprising:

a pair of spaced apart bar-shaped operation members disposed along an axis in an X-Y coordinate plane, said operation members being independently rotatable about the axis;

an encoder connected to each operation member, said encoder generating a rotation-output in response to a rotation of said operation member;

a detecting section for detecting the rotation of each operating member in response to the rotation-output received from each encoder, wherein said detecting section generates a first input mode when said detecting section detects the rotation of only one operation member, and said detecting section generates a second input mode when said detecting section detects the simultaneous rotation of both operation members in the same direction; and a coordinate-data conversion means for converting the rotation-output to movement data in an X-Y-Z coordinate system, said rotation-output being converted to axial movement data in the X-Y coordinate plane in response to either the first input mode or the second input mode, and being converted to rotational movement data about an axis in the X-Y coordinate plane in response to the other mode, further wherein said detecting section generates a third input mode when said detecting section detects the simultaneous rotation of both operation members in opposite directions, said coordinate-data conversion means converting the rotation-detection output in the third input mode to rotational movement data about an axis perpendicular to the X-Y coordinate plane.

2. A data input apparatus according to claim 1, further comprising a comparison means for comparing the rotation-output detected by said detecting section for one operation member of said pair of operation members with the rotation-output detected by said detecting section for the other operation member to determine whether only one of both operation members are rotating, or whether both operation members are rotating at the same time.

3. A data input apparatus according to claim 1, further comprising a single bar-shaped operation member rotatable about an axis parallel to the X-Y coordinate plane and separated from said pair of operation members disposed in said X-Y coordinate plane; an encoder driven by said single operation member; and a detecting section for detecting the rotation-output received from said encoder, wherein said coordinate-data conversion means converts the rotation-output obtained from said detecting section to axial movement data in a Z axis direction perpendicular to the direction of the axial movement data input by said pair of operation members in the X-Y coordinate plane.

4. A data input apparatus according to claim 3, wherein said single bar-shaped operation member is disposed on a plane spaced apart from the X-Y coordinate plane.

5. A data input apparatus comprising:
- a first pair of spaced apart bar-shaped operation members disposed along an X axis in an X-Y coordinate plane, said operation members being independently rotatable about the X axis;
- a second pair of spaced apart bar-shaped operation members disposed along a Y axis in the X-Y coordinate plane, said operation members being independently rotatable about the Y axis;
- an encoder connected to each operation member, said encoder generating a rotation-output in response to a rotation of said operation member;
- a detecting section for detecting the rotation of each operating member in response to the rotation-output received from each encoder, wherein said detecting section generates a first input mode when said detecting section detects the rotation of only one operation member of said pair of operation members, and said detecting section generates a second input mode when said detecting section detects the simultaneous rotation of both operation members of said pair of operation members in the same direction; and
- a coordinate-data conversion means for converting the rotation-output to movement data in the X-Y coordinate plane, said rotation-output being converted to axial movement data in the X-Y coordinate plane in response to either the first input mode or the second input mode, and being converted to rotational movement data about an axis in the X-Y coordinate plane in response to the other mode.

6. A data input apparatus according to claim 5, further comprising a comparison means for comparing the rotation-output detected by said detecting section for one operation member of each pair of operation members with the rotation-output detected by said detecting section for the other operation member of the pair of operation members to determine whether only one of both operation members are rotating, or whether both operation members of the pair of operation members are rotating at the same time.

7. A data input apparatus according to claim 5, further comprising a single bar-shaped operation member rotatable about an axis parallel to the X-Y coordinate plane and separated from said first and second pairs of operation members disposed respectively about said X axis and said Y axis; an encoder driven by said single operation member; and a detecting section for detecting the rotation-output received from said encoder, wherein said coordinate-data conversion means converts the rotation-output obtained from said detecting section to movement data in a Z axis direction perpendicular to from the direction of the axial movement data input by said pair of operation members in the X-Y coordinate plane.

8. A data input apparatus according to claim 7, wherein said single bar-shaped operation member is disposed on a plane spaced apart from the X-Y coordinate plane.

* * * * *